United States Patent [19]

Rabin

[11] Patent Number: 5,201,512

[45] Date of Patent: Apr. 13, 1993

[54] RECEIVER SHEET SUPPLY DRAWER CLOSURE MECHANISM WITH A DAMPING FEATURE

[75] Inventor: Yury K. Rabin, Rochester, N.Y.

[73] Assignee: Eastman Kodak Company, Rochester, N.Y.

[21] Appl. No.: 827,301

[22] Filed: Jan. 29, 1992

[51] Int. Cl.⁵ .............................................. B65H 1/22
[52] U.S. Cl. .................................... 271/164; 312/319.1
[58] Field of Search ................ 271/162, 164; 312/319, 312/348

[56] References Cited

U.S. PATENT DOCUMENTS

| | | | |
|---|---|---|---|
| 1,450,974 | 4/1923 | Heotes . | |
| 2,000,916 | 5/1935 | Bloom . | |
| 3,563,535 | 2/1971 | Vitu et al. | 271/157 |
| 3,854,785 | 12/1974 | Manner et al. | 312/319 |
| 4,750,729 | 6/1988 | Kanoto et al. | 271/162 |
| 4,807,868 | 2/1989 | Hirst et al. | 271/162 |
| 4,856,653 | 8/1989 | Ackeret | 206/387 |

FOREIGN PATENT DOCUMENTS

| 2972 | 1/1989 | Japan | 271/162 |
|---|---|---|---|
| 182626 | 7/1990 | Japan | 271/162 |

Primary Examiner—Joseph E. Valenza
Assistant Examiner—Steven M. Reiss
Attorney, Agent, or Firm—Lawrence P. Kessler

[57] ABSTRACT

A closure mechanism for a receiver sheet supply drawer of a reproduction apparatus having a receiver sheet supply drawer, such drawer being slidable to a first location for loading a receiver sheet stack in the supply drawer and a second location relative to the reproduction apparatus where receiver sheets may be fed in register from said supply drawer. The closure mechanism comprises a variable damping mechanism for damping the movement of the receiver sheet supply drawer from the first location to the second location to assure that the receiver sheet supply drawer approaches the second location at a speed sufficiently slow to prevent receiver sheet stack dishevelment irrespective of the initial speed of the receiver sheet supply drawer as it leaves the first location. When the receiver sheet supply drawer is in the second location, it is releasably latched at a predetermined accurate position in the second location.

10 Claims, 3 Drawing Sheets

RECEIVER SHEET SUPPLY DRAWER CLOSURE MECHANISM WITH A DAMPING FEATURE

BACKGROUND OF THE INVENTION

The present invention relates in general to receiver sheet supply drawer closure mechanisms in reproduction apparatus, and more particularly to a supply drawer closure mechanism which prevents receiver sheet dishevelment on closure of the supply drawer and accurately locates the supply drawer and a stack of receiver sheets therein.

Modern reproduction apparatus, such as copiers, duplicators, or the like, reproduce information on receiver sheets such as cut sheets of plain paper or transparency material. It is common practice in today's high speed reproduction apparatus to provide a stack of receiver sheets of the desired material in a supply hopper, feeding such sheets one at a time from the supply hopper to a station where the information to be reproduced is formed on such sheets respectively. It is of course well recognized that any misregistration of a receiver sheet at the reproduction station will result in the formation of an unacceptable copy.

A potential root source leading to misregistration of a receiver sheet at the reproduction station is the location of the receiver sheets (and the receiver sheet stack) in the supply hopper. Improper location of receiver sheets in the supply hopper can be caused by the supply hopper itself being improperly positioned within the reproduction apparatus, or by dishevelment (relative displacement sheet-to-sheet) of the receiver sheets within the stack in the supply hopper. Such stack dishevelment may result from the simple action of inserting the supply hopper into the reproduction apparatus. For example, the supply hopper may be in the form of a slidable receiver sheet supply drawer movable to an open location external to the reproduction apparatus to load a stack of receiver sheets and to a closed location internal to the reproduction apparatus where sheets are fed to the reproduction station. If the supply drawer is moved from its external location to its internal location at too rapid a speed, a sudden stop of the supply drawer occurs when the drawer reaches the internal location, and the sheets of the contained stack may be disheveled. Further, with prior receiver sheet supply drawer latch mechanisms, the position of the supply drawer at the closed location internal to the reproduction apparatus may vary. This can result in the receiver sheets within the supply drawer being misregistered when fed to the reproduction station of the reproduction apparatus.

SUMMARY OF THE INVENTION

This invention is directed to a receiver sheet supply drawer closure mechanism which accurately locates the supply drawer within a reproduction apparatus such that receiver sheets may be fed in register therefrom, and which prevents stack dishevelment when the supply drawer is moved to its location internal to the reproduction apparatus (the second location) from an external stack loading location (the first location). The closure mechanism comprises a variable damper for damping the movement of the receiver sheet supply drawer from the first location to the second location to assure that the receiver sheet supply drawer approaches the second location at a speed sufficiently slow to prevent receiver sheet stack dishevelment irrespective of the initial speed of the receiver sheet supply drawer as it leaves the first location. When the receiver sheet supply drawer is in the second location, it is releasably latched at a predetermined accurate position in the second location.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
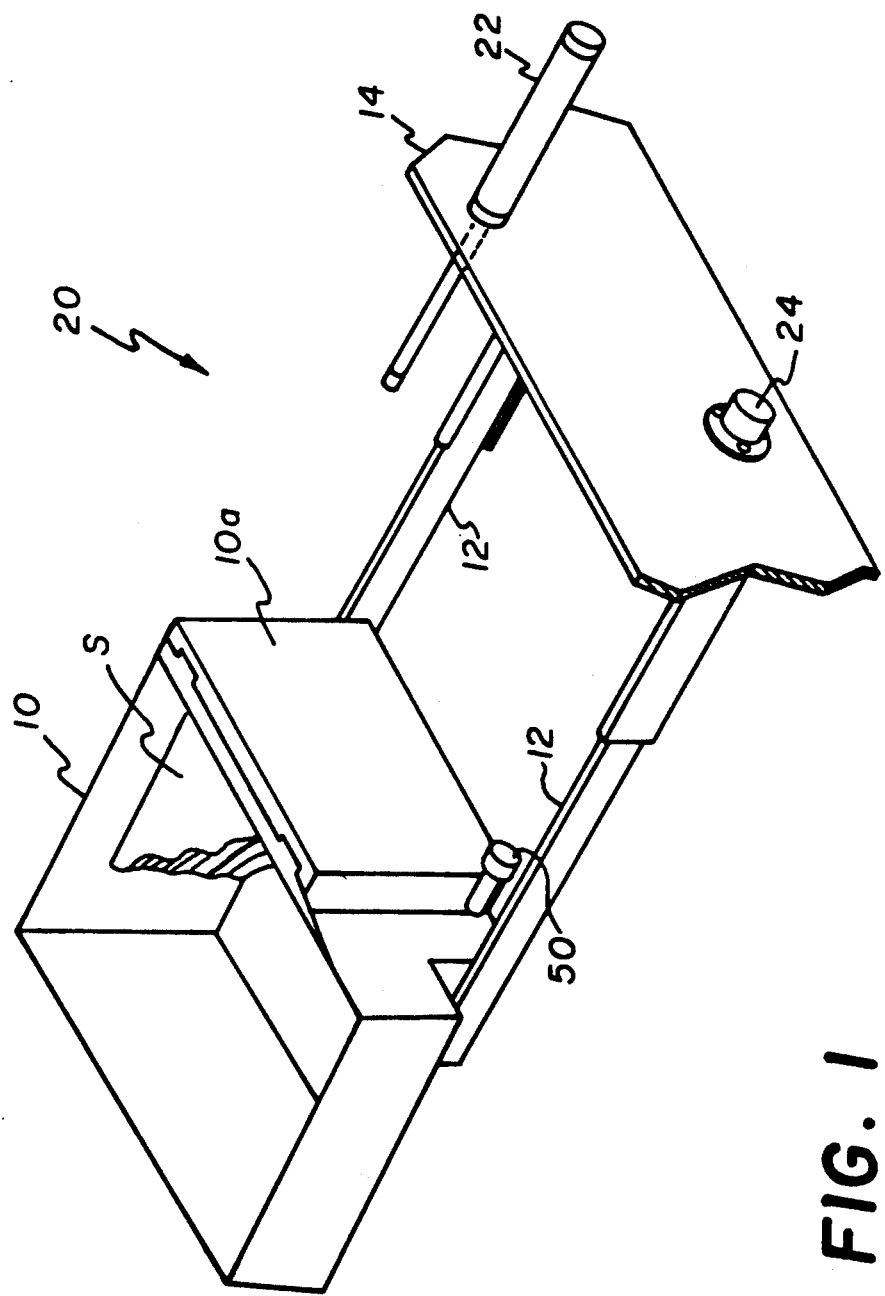
FIG. 1 is a view in perspective of the receiver sheet supply drawer and the closure mechanism therefor according to this invention.

Referring now to the accompanying drawings, FIG. 1 shows a receiver sheet supply hopper in the form of a supply drawer, designated generally by the numeral 10. The receiver sheet supply drawer 10 supports a stack of sheet material S onto which information copies are to be made in any well known reproduction apparatus (not shown). The receiver sheet supply drawer 10 is mounted on rails 12 extending from a frame plate 14 of the reproduction apparatus. The rails 12 enable the supply drawer to be manually moved to a location substantially external to the reproduction apparatus (an open location) for loading a stack of receiver sheets therein, and to a location internal relative to the reproduction apparatus (a closed location) where individual sheets may be readily fed, by any suitable known feed mechanism (not shown), from the sheet stack S in the supply drawer to have the information reproduction formed respectively thereon.

As discussed above, in order to assure that the receiver sheets are properly located in the reproduction apparatus prior to feeding of individual sheets from the supply drawer 10 so that suitable acceptable copies are formed on the respective sheets, the supply drawer must be accurately located within the reproduction apparatus, and the receiver sheets within the supply drawer must be in a stack with uniformly aligned edges (i.e., not disheveled). Therefore, the supply drawer 10 includes a closure mechanism, according to this invention, designated generally by the numeral 20. The closure mechanism 20 comprises two main assemblies, a variable damper 22 and a positioning latch 24. As will be fully described hereinbelow, the damper 22 serves to prevent receiver sheet stack dishevelment irrespective of how fast the supply drawer is moved from the external loading location to the location within the reproduction apparatus (i.e., no matter how hard the supply drawer is closed); and, the latch 24 assures accurate location of the supply drawer 10 within the reproduction apparatus.

Figure 2:
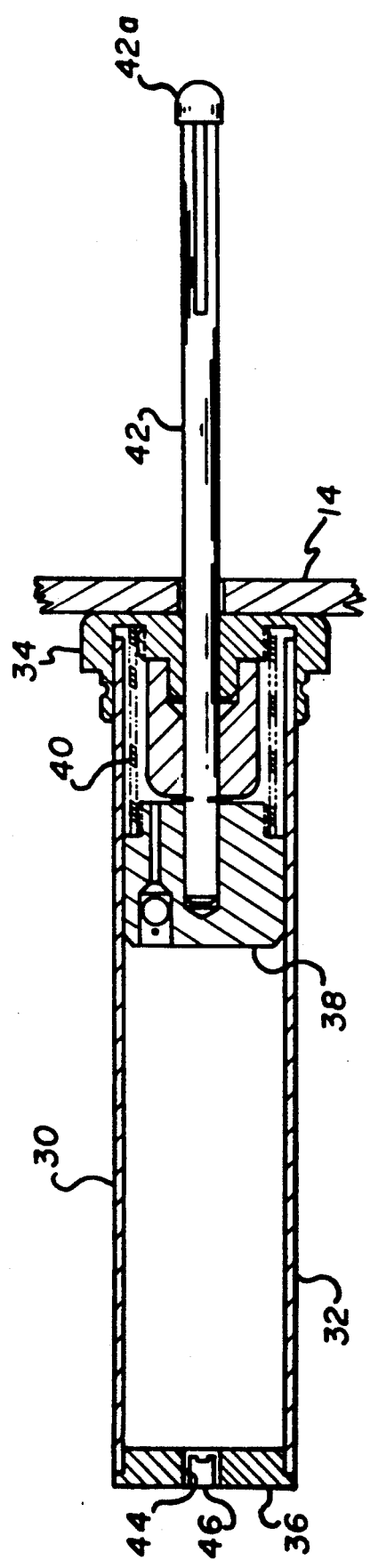
FIG. 2 is a side elevational view, in cross-section, of the receiver sheet supply drawer movement damper of the closure mechanism according to this invention.

The variable damper 22, best shown in FIG. 2, includes a pneumatic (air, for example) cylinder 30 having a hollow tubular body 32 substantially closed by end caps 34 and 36. A piston 38, located within the tubular body 32 in substantial sealing relation therewith, is coupled to the end cap 34 by a tension spring 40 so as to be urged in the direction toward such end cap. The piston 38 has a check valve 38a formed therein to permit air flow in one direction (to the left in the figure). Accordingly, the movement of the piston in one direction (toward end cap 36) is restricted; however, on movement of the piston in the opposite direction, air can escape from between the end cap 34 and the piston through the check valve 38a so as to enable the piston to move relatively freely under the urging of the spring 40 toward the end cap 34.

A plunger 42 is coupled to the piston 38 and extends outwardly from the tubular body 32 through the end cap 34. The damper 22 is supported by the frame 14 (see FIG. 1) such that the plunger 42 thereof extends toward the receiver sheet supply drawer 10. Accordingly, as the supply drawer is moved to the location within the reproduction apparatus, the lead end 42a of the plunger 42 will engage the rear wall 10a of the supply drawer. A bore 44 is provided through the end cap 36 to control flow of air into and out of the tubular body 32 of the pneumatic cylinder 30.

The bore 44 in the end cap 36 of the pneumatic cylinder 30 is particularly configured, for example, to be of a predetermined diameter or may have a restrictor element 44a associated therewith. In this manner, a preselected (controlled) air flow through the bore 44 is established. The preselected air flow is of a rate determined in the following manner. On closing of the receiver sheet supply drawer 10, when the supply drawer is moved relatively slowly from the external loading location toward the internal location and the rear wall 10a engages the plunger 42 of the pneumatic cylinder 30 to depress the plunger within the tubular housing 32, the air between the piston 38 and the end cap 36 escapes substantially unimpeded from the housing through the bore 44. The piston thus moves within the housing 32 substantially unrestricted. However, when the supply drawer 10 is moved relatively rapidly from the external loading location toward the internal location and the rear wall 10a engages the plunger 42 of the pneumatic cylinder to depress the plunger within the tubular housing 32, the rate of air escaping from the housing through the bore 44 is insufficient to allow free movement of the piston. As such, the movement of the piston 38 within the housing 32 is restricted. This action serves to slow the movement of the receiver sheet supply drawer 10 as it approaches the closed internal position. By slowing such movement, any dishevelment of the sheet stack in the supply drawer, as would occur if the drawer moving at the rapid speed were suddenly stopped at the internal position, will be substantially prevented.

Figure 3:
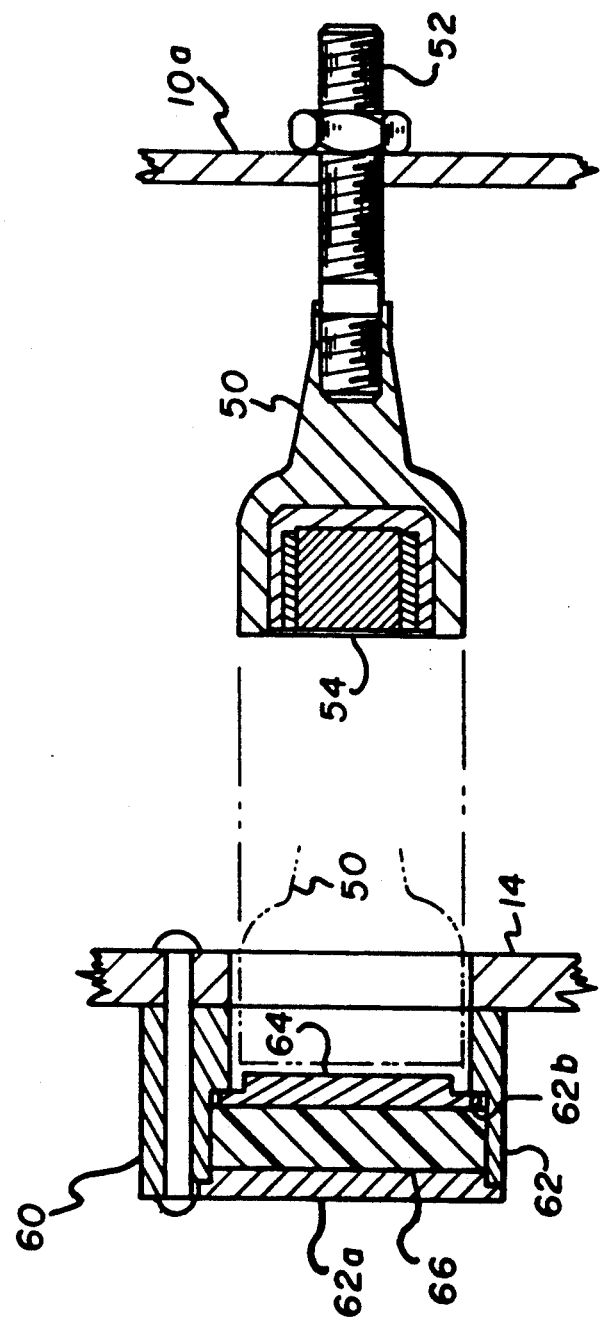
FIG. 3 is a side elevational view, in cross-section and on an enlarged scale, of the positioning latch of the closure mechanism according to this invention.

As also discussed above, for suitable acceptable copies to be made on receiver sheets from the supply drawer 10, the supply drawer must be accurately held at the internal location, such location being established by the positioning latch 24. The positioning latch 24 comprises two basic assemblies, a striker assembly 50 and a striker plate assembly 60 (solid line representation of FIG. 3). The striker assembly 50 includes a rod 52 to which a magnet 54 is attached. The rod is adjustably supported on the rear wall 10a of the supply drawer 10, and held in its adjusted position by a jam nut 56. The striker plate assembly 60 includes a housing 62, fixed to the frame 10a of the reproduction apparatus 10 at a location generally aligned with the magnet 54 of the striker assembly 50, defining an opening facing such magnet. The housing 62 contains a striker plate 64, formed of a material (e.g., metal) to which the magnet 54 is attracted, and a resilient (e.g., a rubber plug) backup member 66 located between the striker plate and the rear wall 62a of the housing. The striker plate 64 serves to capture the magnet 54 as the striker assembly 50 is brought into close proximity with the striker plate when the supply drawer 10 is moved to the internal location (phantom line representation of FIG. 3). The strength of the magnet 54 is selected to assure the desired capture takes place, but enable release of the magnet from the striker plate can readily be effected when it is desired to move the supply drawer 10 to the loading location.

The resilient backup member 66 serves two functions. First, the backup member 66 cushions the engagement action as the magnet 54 strikes the striker plate 64. This further assures that the receiver sheet supply drawer 10 comes to a slow and relatively even stop to prevent dishevelment of the sheet stack in the supply drawer. Second, the backup member 66 urges the striker plate 64 against a shoulder 62b formed in the housing 62. That is, after the magnet 54 strikes the striker plate 64 and the supply drawer is brought to rest, the backup member urges the striker plate, and thus the striker assembly 50 and the supply drawer 10, in the direction (toward the right in FIG. 3) until the striker plate engages the shoulder 62b. The shoulder 62b thus forms a datum against which adjustment of the rod 52 can be effected to determine the accurate location of the supply drawer 10 when in the location internal to the reproduction apparatus. Of course, since the positioning latch 24 embodies a magnetic coupling between the striker plate 64 and the magnet assembly 54, the positioning latch is readily releasable when it is desired to move the receiver sheet supply drawer 10 to the external receiver sheet stack loading location.

The invention has been described in detail with particular reference to preferred embodiments thereof, but it will be understood that variations and modifications can be effected within the spirit and scope of the invention as set forth in the claims.

What is claimed is:

1. In a reproduction apparatus having a receiver sheet supply drawer slidable to a first location for loading a receiver sheet stack in said supply drawer and a second location relative to said reproduction apparatus where receiver sheets may be fed in register from said supply drawer, a closure mechanism for said receiver sheet supply drawer, said closure mechanism comprising:

a variable damper including a pneumatic cylinder, a piston located within said pneumatic cylinder, a plunger attached to said piston and extending outwardly from said pneumatic cylinder in a direction toward said receiver sheet supply drawer, and a port defined through a wall of said pneumatic cylinder opposite said plunger, said port being of a predetermined diameter such that when said receiver sheet supply drawer strikes said plunger at a relatively low speed, pneumatic fluid in said pneumatic cylinder readily escapes through said port so that movement of said supply drawer is substantially unaffected, and when said receiver sheet supply drawer strikes said plunger at a speed substantially higher than the slow speed, pneumatic fluid in said pneumatic cylinder is restricted in its escape through said port so that movement of said supply drawer is substantially slowed whereby movement of said receiver sheet supply drawer from the first location to the second location is damped to assure that said receiver sheet supply drawer approaches the second location at a speed sufficiently slow to prevent receiver sheet stack dishevelment irrespective of the initial speed of said receiver sheet supply drawer as it leaves the first locatoin; and means for releasably latching said receiver sheet supply drawer at a predetermined accurate position in the second location.

2. The closure mechanism of claim 1 wherein said latching means includes a first assembly adjustably attached to said supply drawer, and a second assembly defining a datum position relative to said reproduction apparatus, said second assembly including means for releasably capturing said first assembly and means for urging said capturing means toward said datum position.

3. The closure mechanism of claim 2 wherein said first assembly includes a magnetic member, a rod attached to said magnetic member, and means for adjustably connecting said rod to said supply drawer.

4. The closure mechanism of claim 3 wherein said capturing means includes a plate magnetically attractable to said magnetic member of said first assembly.

5. The closure mechanism of claim 4 wherein said urging means of said second assembly includes a resilient member located relative to said plate so as to absorb the motion of said magnetic member when said magnetic member strikes said plate and thereafter return said plate to said datum position.

6. In an apparatus wherein reproductions are made on receiver sheets fed in register from a supply drawer, said supply drawer comprising:

means for mounting said supply drawer so as to be slidable to a first location substantially external to said reproduction apparatus for loading a receiver sheet stack in said supply drawer and a second location relative to said reproduction apparatus where receiver sheets may be fed in register from said supply drawer;

means for damping movement of said supply drawer from said first location to said second location, said damping means including a pneumatic cylinder, a piston within said pneumatic cylinder having a plunger extending outwardly from said pneumatic cylinder in a direction toward said receiver sheet supply drawer, and means for controlling escape of fluid from said pneumatic cylinder such that when said receiver sheet supply drawer strikes said plunger at a relatively low speed, pneumatic fluid in said pneumatic cylinder readily escapes so that movement of said supply drawer is substantially unaffected, and when said receiver sheet supply drawer strikes said plunger at a speed substantially higher than the slow speed, pneumatic fluid in said pneumatic cylinder is restricted in its escape so that movement of said supply drawer is slowed; and means for releasably latching said receiver sheet supply drawer at a predetermined accurate position in the second location.

7. The receiver sheet supply drawer of claim 6 wherein said latching means includes a first assembly adjustably attached to said supply drawer, and a second assembly defining a datum position relative to said reproduction apparatus, said second assembly including means for releasably capturing said first assembly and means for urging said capturing means toward said datum position.

8. The receiver sheet supply drawer of claim 7 wherein said first assembly includes a magnetic member, a rod attached to said magnetic member, and means for adjustably connecting said rod to said supply drawer; and wherein said capturing means includes a plate magnetically attractable to said magnetic member of said first assembly.

9. The receiver sheet supply drawer of claim 8 wherein said urging means of said second assembly includes a resilient member located relative to said plate so as to absorb the motion of said magnetic member when said magnetic member strikes said plate and thereafter return said plate to said datum position.

10. The receiver sheet supply drawer of claim 6 wherein said fluid escape controlling means includes a port defined through a wall of said cylinder opposite said plunger, said port being of a predetermined diameter.

* * * * *